United States Patent [19]

Pearce et al.

[11] Patent Number: 5,204,033

[45] Date of Patent: Apr. 20, 1993

[54] METHOD OF FABRICATING A PREFORM IN A RESIN TRANSFER MOLDING PROCESS

[75] Inventors: Robert G. Pearce; Samuel J. Osten, both of Lincoln, Nebr.

[73] Assignee: Brunswick Corporation, Skokie, Ill.

[21] Appl. No.: 780,008

[22] Filed: Oct. 21, 1991

[51] Int. Cl.⁵ ................. B29C 45/14; B29C 53/60
[52] U.S. Cl. ..................... 264/136; 156/174; 264/137; 264/138; 264/154; 264/219; 264/255; 264/258
[58] Field of Search ............... 156/174; 264/136, 137, 264/138, 154, 255, 219, 258

[56] References Cited

U.S. PATENT DOCUMENTS

| | | | |
|---|---|---|---|
| 3,700,535 | 10/1972 | McCoy et al. | 156/174 |
| 3,873,291 | 3/1975 | Miller | 156/174 |
| 4,121,002 | 10/1978 | Baldwin | 264/136 |
| 4,167,429 | 9/1979 | Ackley | 156/174 |
| 4,385,952 | 5/1983 | Futakuchi et al. | 156/174 |
| 4,512,836 | 4/1985 | Tucci | 156/174 |
| 4,740,262 | 4/1988 | Yavorsky et al. | 264/255 |
| 4,762,740 | 8/1988 | Johnson et al. | 264/257 |
| 5,037,599 | 8/1991 | Olson | 264/136 |

Primary Examiner—Jan H. Silbaugh
Assistant Examiner—Brian J. Eastley
Attorney, Agent, or Firm—Wood, Phillips, VanSanten, Hoffman & Ertel

[57] ABSTRACT

A method of fabricating a preform for use in a resin transfer molding process. The method includes the steps of locating a transport member on a mandrel. A dry fiber layer is filament wound about the mandrel over the transport member. A tackifier is applied to the dry fiber layer at least in the area of the transport member. The filament wound dry fiber layer is cut about the transport member to provide a preform thereon. The preform is transported to a resin transfer mold by use of the transport member. The preform then is resin transfer molded in the mold.

37 Claims, 3 Drawing Sheets

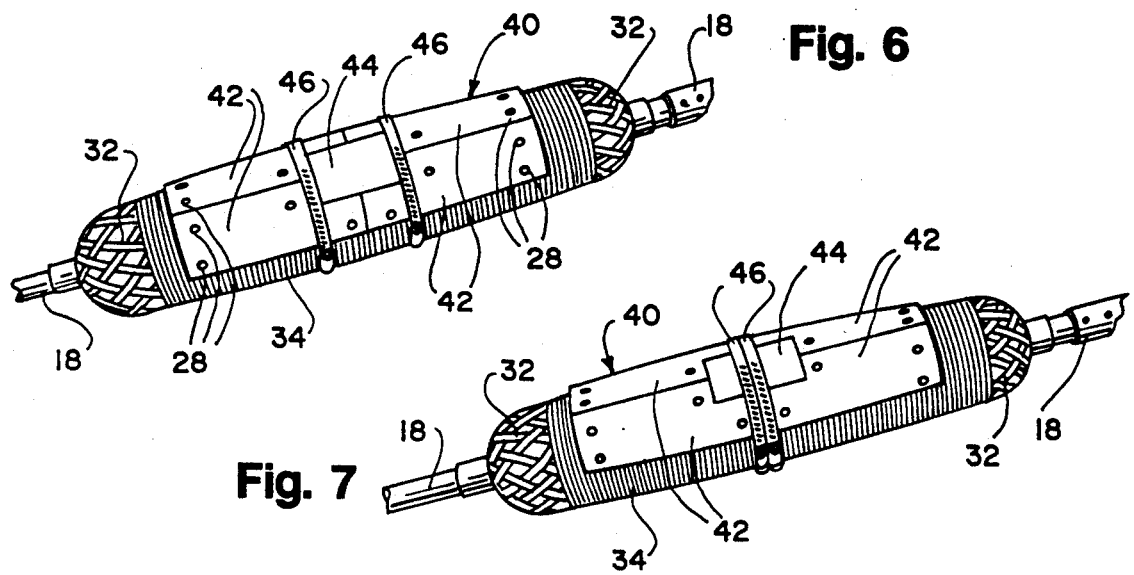
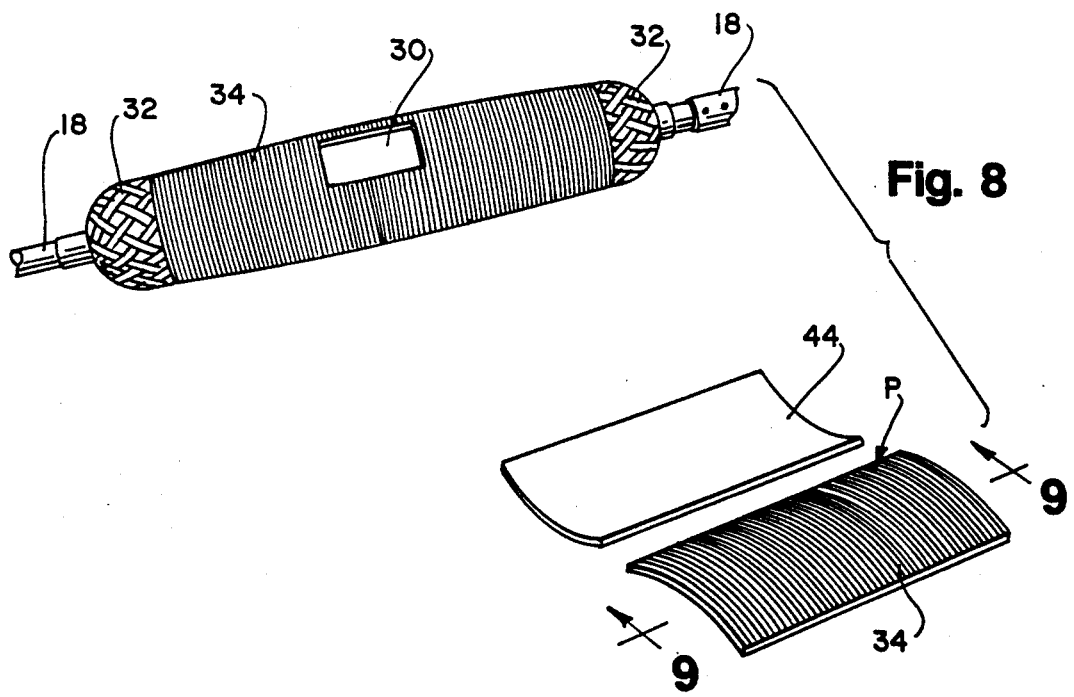

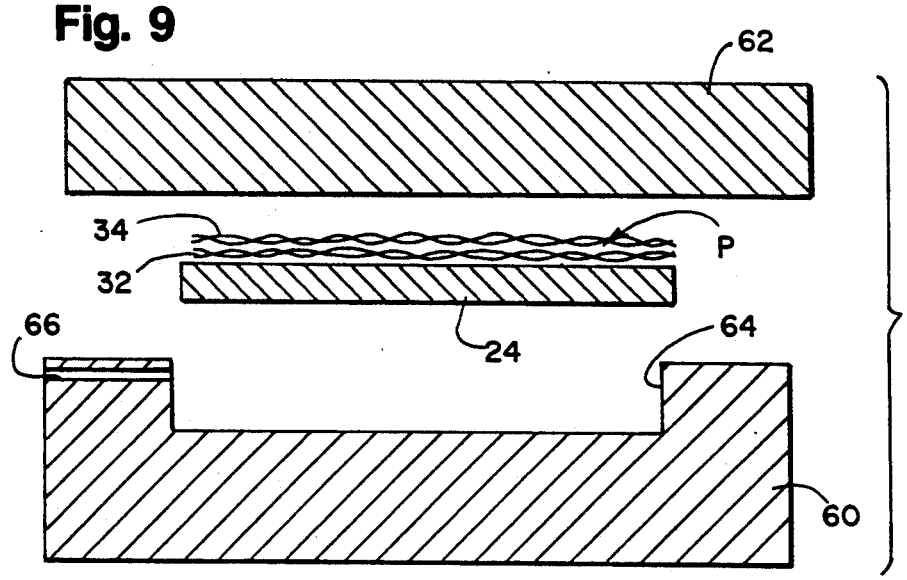
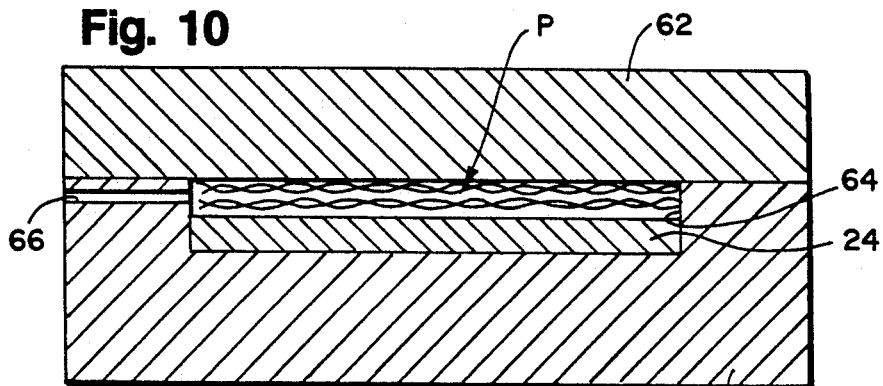
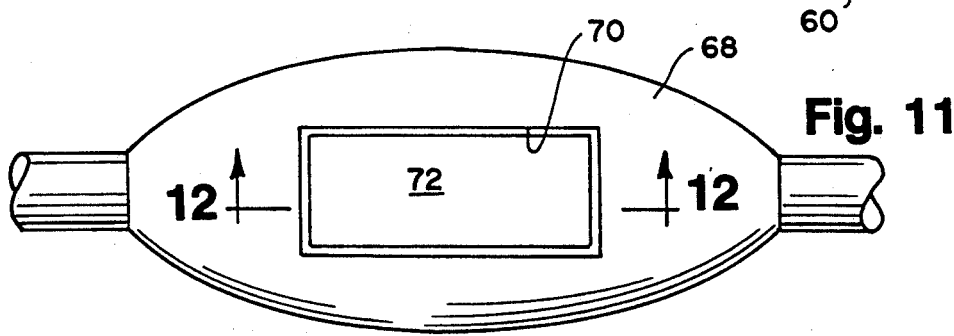
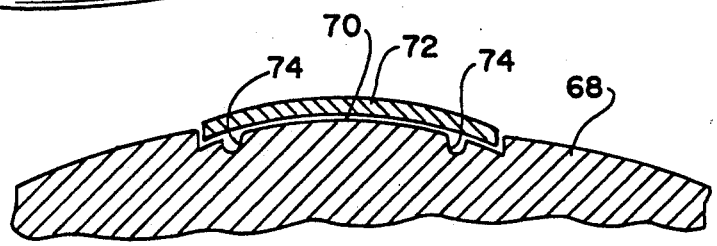

METHOD OF FABRICATING A PREFORM IN A RESIN TRANSFER MOLDING PROCESS

FIELD OF THE INVENTION

This invention generally is directed to resin transfer molding and, particularly, to the fabrication of a resin transfer molding preform including filament winding the preform and transporting the preform intact to a resin transfer mold cavity.

BACKGROUND OF THE INVENTION

Resin transfer molding has been used to manufacture composite or filament oriented structures of various sizes and shapes. Predominantly, this approach, which emerged from the textile industry, involves the assembly of dry, unimpregnated fibrous preforms for subsequent injection or infusion of a matrix resin, such as epoxy or the like. Historically, fabric is the starting point for most preforms because the fabric positions the reinforcing fibers in principal directions. Preform fabrics can be of any one of the conventional fabrics, such as a plain weave, satin, unidirectional or multidirectional knitted or bias weave fabrics. The fabric selection usually is dependent upon the final properties desired in the structure as well as the configuration of the manufactured part. As structural performances of a given component increases, the use of "non-crimped" fabric (that is, knitted and woven unidirectional fabrics) become more desirable because of the increase in tensile and compression performance. Increased performance is gained by eliminating the kinks within fiber bundles that result from the over-and-under construction of woven materials.

Preform fabrics may be of fiberglass, carbon and aramid fibers. Silicone carbide, aluminum oxide, boron, borsic, quartz and other fibers also are used in specific applications. As with all composite structures, selecting the reinforcing fiber for the preform depends on the end-use characteristics desired in the composite structure.

Generally, as defined in Johnson U.S. Pat. No. 4,762,740, dated Aug. 9, 1988, resin transfer molding is a closed mold, low pressure process applicable to the fabrication of complex, high performance composite articles of both large and small size. Several different resin transfer molding processes are known in the art, as set forth in somewhat detail in that patent. The process is differentiated from various other molding processes in that reinforcement fibrous material is placed separately into a molding tool cavity and then combined with resin within the mold cavity to form a fiber reinforced plastic composite product. Typically, a preshaped fiber reinforcement is positioned within a molding tool cavity and the molding tool then is closed. A feed line connects the closed molding cavity with a supply of liquid resin and the resin is pumped into the cavity where it impregnates and envelopes the fiber reinforcement and subsequently cures or is cured.

The desired mechanical and thermal performance of the composite structure is established during the preform design process. Preform assembly converts individual fabrics into a multilayered configuration specified by the composite designer. The fabric layers are assembled into the final configuration in a process analogous to a prepreg lamination operation. Fabric layers are placed in a predetermined orientation by rotating the principal axes of the fabric layers or by using a multidirectional fabric. The assembly process can be automated by using broad goods spreaders and robotic placement.

The final operation in preform assembly is the stitching process. Stitching mechanically fixes the final shape of the preform and constrains fiber movement during resin impregnation.

Whenever a stitching operation is to be performed, it is advantageous to work with a fiber preform that is free of resin or heavy binders because their presence limits the mobility of the fiber during needle penetration and results in a large number of fractured preform and thread fibers.

Resin injection fusion is a technique for impregnating preforms with hot-melt resin systems, which are resins that are solid at room temperature. These resins include typical aerospace-grade epoxies, bismaleimides, and polyimides.

Preforms are loaded into a holding fixture to stabilize the preform during the infusion process. Resin, in film form, is positioned uniformly onto the preform. Actual impregnation occurs in a heated vacuum chamber. The preform, with resin applied, is positioned in the chamber. Heat is then transmitted to the preform and resin by means of infrared radiation. A vacuum is applied during the impregnation cycle to remove entrained air and volatiles from the filmed resin. Preform impregnation occurs through capillary wetting of the preform as the viscosity of the resin decreases. During impregnation, the vacuum is cycled to prevent excessive resin bubbling and provide a mechanical pumping action to complement capillary wetting. At the end of this cycle, the resin is not cured.

In the resin film infusion/pressure molding process, the final sequence is the molding operation itself, which establishes the final shape of the composite structure, fixes the proportions of fiber and resin, cures the resin, and provides the composite structure with its designated mechanical and thermal properties.

In the resin transfer molding process, a thermosetting resin is injected into a cavity having the shape of the desired part. The cavity is filled with a dry fiber preform. The preform can include closed-cell cores and metal inserts, in addition to the fabric/mat materials. The process is typically used with low-viscosity fast-curing resins, such as polyester and epoxy, and chopped-strand or continuous mat reinforcement at a low fiber volume. However, the process has been demonstrated with higher fiber volumes of oriented material and higher-performance matrices, such as polyimides.

The preceding information is found in T. DeMint and H. Van Schoonevelt, *Fiber Preforms and Resin Injection*, in Engineered Materials Handbook, Volume 1, Composites, ASM International, 1987, p 529-532.

In general, designing preforms from layers of cloth fabric is a rather expensive proposition for use in resin transfer molding processes. First, purchasing the fabric itself is expensive. Then, the fabric or cloth layers must be laid-up onto a mandrel and, conventionally, stitched together into a multi-layer construction. Transporting the assembled layers or preform to a mold is a considerable problem. Still, such a preform does not provide the improved characteristics of a filament wound composite. On the other hand, continuous fibers can be purchased literally for pennies per linear length and easily laid-up by a simple winding process. If there was a simple solution to the transporting problem, filament wound preforms would be a vast improvement in the art.

This invention is directed to solving the above problems and satisfying the need for a new and improved filament wound resin transfer molding preform assembly process.

SUMMARY OF THE INVENTION

An object, therefore, of the invention is to provide a new and improved method of fabricating a preform for use in a resin transfer molding process, the method being extremely cost-effective and simple in performance.

In an exemplary embodiment of the invention, the method generally includes the steps of locating a transport means on a mandrel, and filament winding a dry fiber layer or thickness about the mandrel over the transport means. Preferably a tackifier is applied to the dry fiber layer at least in the area of the transport means. The filament wound dry fiber layer is cut about the transport means to provide a preform thereon. The preform is transported to a resin transfer mold by means of the transfer means, and the preform is fabricated by a resin transfer molding process in the mold.

The invention contemplates a novel transport means and cover structure which not only facilitates transporting the preform to the mold cavity, but facilitates cutting the preform from the mandrel in a desired shape. More particularly, an inner shell is laid-up and cured on the mandrel before filament winding the thickness which forms the preform. The inner shell includes a plurality of sections, with the transport means being one of the sections. The periphery of the one section defines a cut line for cutting the preform from the filament wound dry fiber layer which is wound over the inner shell. An outer shell of composite material also is laid-up and cured over the cured inner shell before filament winding the dry fiber layer which forms the preform. The outer shell also includes a plurality of sections including a cover section of the same shape and in registry with the one section of the inner shell which defines the transport means. The cured outer shell is provided for positioning over the filament wound dry fiber layer to sandwich the preform between the shells. Preferably, a filler layer, such as rubber or the like, is positioned over the cured inner shell before laying-up the outer shell. The filler layer is of the same thickness as the filament wound dry fiber layer which forms the preform.

Other aspects of the exemplary embodiment include applying the tackifier by feeding the filaments to be wound about the mandrel through a tackifier bath. Additional tackifier is sprayed onto the wound filaments. The filaments preferably are wound in different winding patterns, such as helical and circumferential patterns.

It would be desirable that the mandrel be reusable to continuously process the preforms. In such an instance, a cutting barrier, such as a thin sheet of metal material (e.g., brass or the like) is positioned on the mandrel about the area of the transport means to prevent scoring of the mandrel by a cutting instrument.

Still further, it may be desirable to compact the filament wound dry fiber layer before it is cut to form the preform. This can be performed by a heat-shrink tape, clam-shell structures or the like.

With the above process, the cut preform is transported from the mandrel to the resin transfer molding cavity by the preform being sandwiched between the inner and outer shells which were used sort of as a template to cut the preform, the sandwiching shells maintaining the filament configuration of the preform during cutting.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 6 shows the outer shell applied over the filament wound dry fiber layer with a pair of clamps holding a cover section of the outer shell to facilitate cutting about the periphery of the preform;

FIG. 7 is a view similar to that of FIG. 6, with the clamps moved to finish the cutting operation;

FIG. 8 is a perspective view of the cut preform and cover section of the outer shell removed from the mandrel;

FIG. 9 is an exploded schematic illustration of a mold tool for resin transfer molding the preform, the tool being in open condition;

FIG. 10 is a view similar to that of FIG. 9, with the mold tool in closed condition;

FIG. 11 is a somewhat schematic illustration of a winding mandrel showing an alternate form of transport means; and FIG. 12 is a fragmented section taken generally along line 12—12 of FIG. 11.

DETAILED DESCRIPTION OF THE PREFERRED EMBODIMENT

Figure 1:
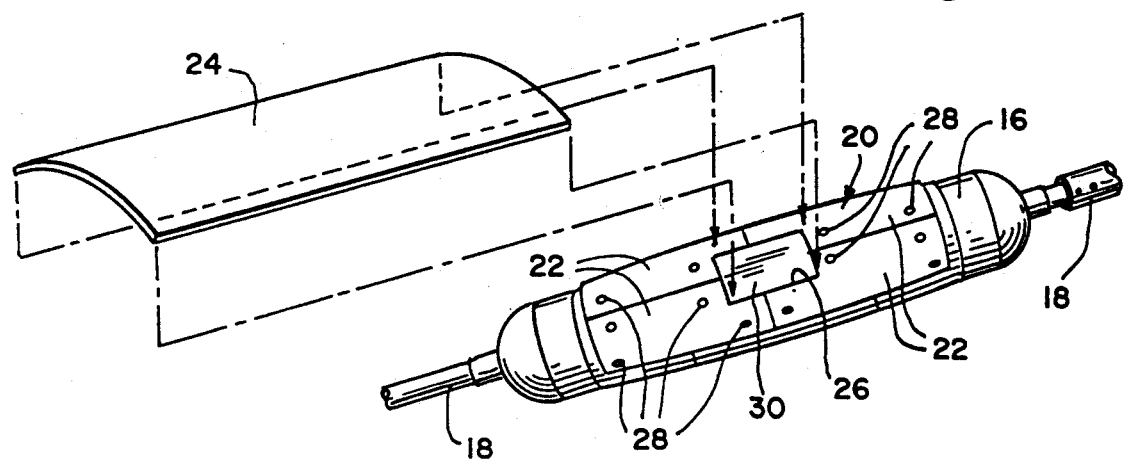
FIG. 1 is a perspective view of a mandrel having the inner shell positioned thereon, and the one section of the shell which forms the shape of the preform being removed to facilitate the illustration.

Referring to the drawings in greater detail, and first to FIG. 1, the invention is directed to a method of fabricating a preform for use in a resin transfer molding process, and particularly wherein the preform is fabricated of a dry fiber layer or thickness of filament wound material. As illustrated in FIG. 1, a reusable mandrel 16 is provided of steel material or the like. The mandrel is conventional and has end shaft fittings 18 for rotating the mandrel in a filament winding apparatus. Generally, the invention contemplates fabricating a preform in a number of layers of "dry" fiber reinforcement which are filament wound on mandrel 16, cut from the mandrel and placed in a mold where resin is injected, i.e. in a resin transfer molding process. The method of the invention allows the dry fibers to be wound on the mandrel and then accurately cut from the mandrel without disturbing the desired fiber orientation. This is accomplished by the use of special tools in the form of inner and outer shells.

More particularly, the "tools" of the invention actually comprise composites which are cured on mandrel 16, before the filament winding steps, and then used as the tooling for fabricating the preform and transferring the preform to the resin molding cavity.

Figure 2:
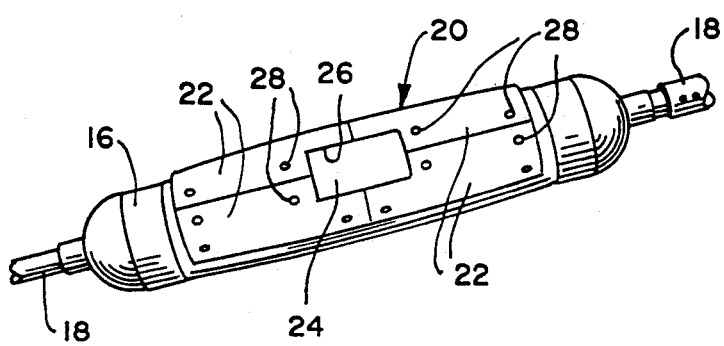
FIG. 2 is a view similar to that of FIG. 1 with the removed section of FIG. 1 back in position on the mandrel.
Figure 3:
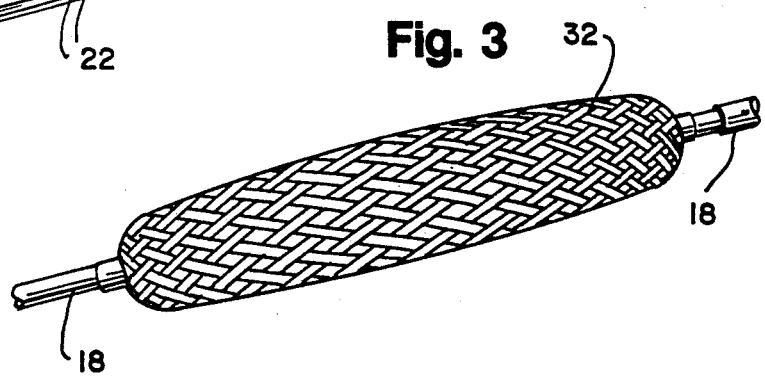
FIG. 3 illustrates a step of the method wherein the helical windings of the filament wound dry fiber layer are wound over the inner shell.

Specifically, FIGS. 1 and 2 show an inner shell, generally designated 20, which is fabricated in a plurality of sections, namely four corner or quadrant sections 22 and a center section 24. All of sections 22, 24 are fabricated from a plurality (e.g. ten) plies of fibrous cloth impregnated with an epoxy resin. The cloth may be of glass fabric and the plies are stacked and cured on the reusable steel mandrel in a desired shape. For simplicity purposes in describing the invention, each of sections 22 include a plurality of plies of cloth cut into a rectangular shape, with the inner adjacent corners of the sections cut-out to form a rectangular cavity 26 (FIG. 2) within which center section 24 can be positioned as shown in FIG. 3. The center section is laid-up of the same numbers of plies of cloth as corner sections 22. Pins 28 can be seen projecting from mandrel 16 through corner sections 22 for properly locating the corner sections. In addition, a cutting barrier 30 can be positioned on the mandrel about the area of center section 24 to protect the mandrel from scoring (as described hereinafter) since, preferably, the mandrel is reusable. The cutting barrier may be provided in the form of a 0.01 inch thick sheet of brass shim stock adhered to the mandrel by tape, appropriate adhesive or the like.

Once the plies of impregnated cloth are laid onto mandrel 16 as shown in FIG. 2, the entire inner shell 20 is cured to form the inner tooling for fabricating the preform of the invention. It must be understood, again, that the rectangular configuration of center section 24, which forms the ultimate shape of the preform, is shown as a simple rectangular configuration to simplify the description of the invention. Preforms of a variety of shapes or configurations are contemplated by the invention.

Once inner shell 20 including sections 22 and 24 are cured on mandrel 16, a dry fiber layer or thickness of filament wound material is wound about the mandrel over inner shell 20. FIG. 3 shows a helical layer of filaments which have been wound over the layer at a winding angle of approximately 18 degrees with respect to the mandrel's longitudinal axis. In actual practice, a "dry" fiber consisting of Owens Corning S-2 glass fiber was used, and one helical layer (two plies) was applied to the mandrel. The total tension of the glass fibers was on the order of fourteen pounds. This corresponds to individual strand tension of approximately 3.5 pounds.

Figure 4:
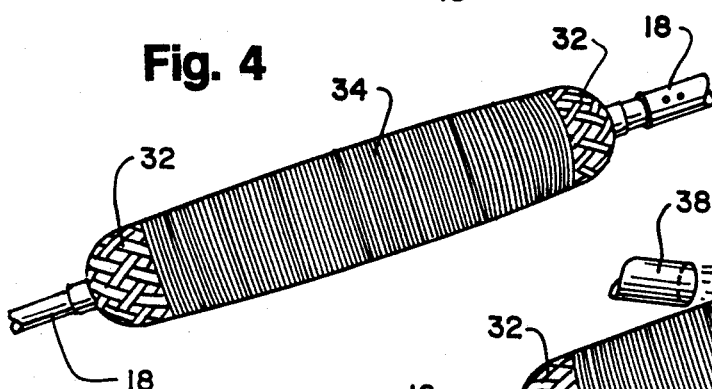
FIG. 4 is a view similar to that of FIG. 3, illustrating the circumferential windings over the helical windings.

As seen in FIG. 4, one layer of circumferential windings has been applied over the glass helical layer. In actual practice, the circumferential windings were applied at an angle of approximately 90 degrees with respect to the longitudinal axis of the mandrel. The circumferential windings specifically were of Amoco T650/35 12K graphite roving. Strand tension measured approximately 3.5 pounds.

During winding of helical windings 32 (FIG. 3) and circumferential windings 34 (FIG. 4), preferably a tackifier is applied to the wound filaments. For instance, during winding, the dry fiber may be fed through a bath of acetone solvent which contains a powdered tackifier, such as Dow Corporation Tactix 226 tackifier at a mixture of 5% tackifier by weight. This tackifier helps to bond the wound dry fibers together to improve handling. Additional tackifier solution may be sprayed directly onto the wound fiber. In essence, the tackifier provides a temporary binder to facilitate maintaining fiber orientation when transporting the preform to the resin transfer molding cavity.

Figure 5:
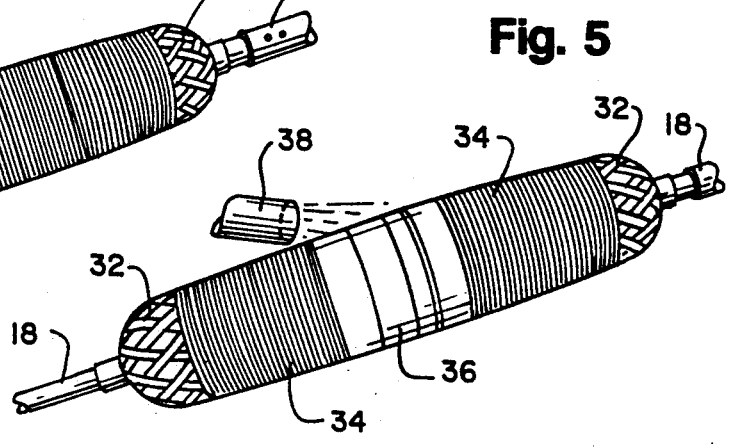
FIG. 5 shows a shrink tape being applied over the area of the filament wound dry fiber layer which includes the preform area.

Referring to FIG. 5, once the filament wound dry fiber layer is wound over inner shell 20 and the tackifier is applied, a compaction step may be used to again maintain the fiber orientation. One process for compaction of the wound fibers is by means of a heat-shrink tape 36 (FIG. 5) which is wrapped about the area of the preform (i.e. center section 24 of inner shell 20), and the tape is shrunk by applying heat thereto by any appropriate means, as at 38. Of course, other types of compaction means can be used such as clamps, clam shells and the like. After the shrink tape shown in FIG. 5 is contracted about the wound dry fiber layer, the tape is removed.

Referring to FIGS. 6 and 7, an outer shell or tooling, generally designated 40, then is placed over the filament wound dry fiber layer. Before proceeding further with an explanation of fabricating the preform itself, fabrication of outer shell 40 will be described. Specifically, outer shell 40 will have been fabricated preliminarily similar to the fabrication of inner shell 20. In other words, the outer shell again is fabricated of a plurality of sections, including corner or quadrant sections 42 and a center section 44. These sections are dimensioned similar to sections 22 and 24 of inner shell 20. The sections are fabricated by laying-up a plurality of plies of impregnated fibrous cloth and curing the sections in position on mandrel 16 over the inner shell so that the shells match in contour. In order to insure that the outer shell conforms substantially identical to the shape of the outside of the filament wound dry fiber layer, preferably a filler layer (not shown) is disposed between the inner shell and the outer shell before curing the outer shell. To this end, in actual practice, a layer of flexible material, such as rubber, is sandwiched between the inner and outer shells and of the same expected thickness of the filament wound dry fiber layer (e.g. 0.060 inch thick). After the outer shell is cured, the filler layer and the outer shell are removed and put aside for winding the dry fiber layer as shown and described above in relation to FIGS. 3-5. Of course, once the inner and outer shells are fabricated, like the mandrel, the shells and their various sections are reusable in a production environment.

After outer shell 40 is positioned over the filament wound dry fiber layer and positioned on pins 28 protruding from the mandrel, the filament wound thickness sandwiched therebetween now can be cut to form the preform. This is accomplished by simply cutting about center section 44 of outer shell 40 as the center section acts as a template. A straight edge knife, for instance, might be used. During cutting, clean cuts are made through the dry fiber layer, including circumferential graphite fibers 34 (FIG. 4) and helical glass fibers 32 (FIG. 3). The periphery of center section 24 of inner shell 20 guides the cutting tool in a clean cut, with the dry fiber layer sandwiched between the inner and outer shells. Cutting barrier 30 (FIG. 1) prevents the steel mandrel from becoming scored during the cutting operation, particularly since the mandrel will be reused.

During the cutting operation, preferably some form of means might be used to hold sections 42 and 44 of outer shell 40 down against the filament wound dry fiber layer. In an experimental set up, circular clamps 46 (FIG. 6) were used along the end edges of center section 44. The cutting tool then was used to cut along the side or longitudinal edges of the center section and through the filament wound dry fiber layer. The clamps then were moved inwardly as shown in FIG. 7 to cut the end edges and the corners about the center section to complete the cut to form a corresponding rectangular section through the filament wound dry fiber layer.

At this point, it should be understood that outer shell 40 has proven advantageous to maintain the shape of the filament wound dry fiber layer 32, 34 and to maintain the orientation of the filaments of the composite. However, it is contemplated that other cutting means can be used rather than a physical or mechanical cutting tool having a straight cutting edge. For instance, it is contemplated that the dry fiber layer can be laser cut. In such an instance, the outer shell might be totally eliminated.

Once the filament wound dry fiber layer is cut into the shape of the preform as described in relation to FIGS. 6 and 7, circular clamps 46 are removed and the entire sandwich, including center section 24 of inner shell 20, center section 44 of outer shell 40 and the section of the dry fiber layer sandwiched therebetween, are removed from the mandrel and transported to the resin transfer molding station. To this end, FIG. 8 shows the entire sandwich removed from the mandrel, with cutting barrier 30 visible through the cut-out area in FIG. 8. Simply for illustration purposes, the bottom portion of FIG. 8 shows the cut center section 44 of the outer shell flipped over to expose the cut-out preform "P", the preform resting on top of center section 24 of the inner shell.

The sandwiched preform then is transported to the resin transfer molding station, center section 44 of the top shell is removed, and the preform is inserted into a mold cavity along with center section 24 of the inner shell. More particularly, FIGS. 9 and 10 somewhat schematically illustrate a mold including a lower mold half 60 and an upper mold half 62, the lower mold half having a molding cavity 64. Center section 24 of the inner shell is shown supporting preform "P" including inner helical windings 32 and outer circumferential windings 34. This subassembly is positioned into cavity 64 as shown in FIG. 10. Upper mold half 62 then is closed onto lower mold half 60. Resin then is injected into the cavity through an appropriate passage 66 to infuse or impregnate the filament wound preform for curing into the desired shape as defined by the transport means of center section 24 of the inner shell, the shape being shown straight in FIGS. 9 and 10 as if taken in the longitudinal direction of the preform as indicated by line 9—9 in FIG. 8.

FIGS. 11 and 12 show an embodiment of the invention wherein bottom shell 20 (FIG. 2) has been eliminated at least to the extent of fabricating the inner shell or tooling in a plurality of sections. In the embodiment shown in FIGS. 11 and 12, a reusable mandrel 68 is provided with a contoured cavity 70 of a depth for receiving a transport member 72. In other words, the transport member 72 would correspond to center section 24 of inner shell 20. Mandrel 68 may be fabricated of the vacuum type which would include vacuum passages 74 within cavity 70 to hold transport member 72 down onto the mandrel. This vacuum hold-down concept also is contemplated in relation to the sectioned inner shell 20, described above. Of course, passages 74 would be appropriately connected to a source of vacuum. With the embodiment of FIGS. 11 and 12, the filament wound dry fiber layer, such as windings 32 and 34 (FIGS. 3 and 4, respectively), would be wound directly onto mandrel 68 over the top of transport member 72. Once wound, the preform would be cut about the periphery of the transport member in any of the processes described above. The transport member would be used similarly to center section 24 of inner shell 20 to transport the preform to an appropriate resin transfer molding cavity.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A method of fabricating a preform for use in a resin transfer molding process, comprising the steps of:
   locating a transport means on a mandrel;
   filament winding a dry fiber layer about the mandrel over the transport means;
   applying a tackifier to the dry fiber layer at least in the area of the transport means;
   cutting the filament wound dry fiber layer about the transport means to provide a preform thereon;
   transporting the preform to a resin transfer mold by means of the transport means; and
   resin transfer molding the preform in the mold.

2. The method of claim 1, including the steps of initially forming said transport means to the contour of the mandrel where the transport means is located.

3. The method of claim 2 wherein said transport means is formed by laying-up and curing a plurality of plies of composite material on the mandrel.

4. The method of claim 1 wherein an inner shell of a composite material is laid-up and cured on the mandrel before filament winding the dry fiber layer which forms the preform, the inner shell including a plurality of sections, with said transport means being one of the sections, and the periphery of the one section defining a cut line for cutting the preform from the filament wound dry fiber layer which is wound over the inner shell.

5. The method of claim 4 wherein an outer shell of a composite material is laid-up and cured over the cured inner shell before filament winding the dry fiber layer which forms the preform, the outer shell including a plurality of sections including a cover section of the same shape and in registry with the one section of the inner shell which defines the transport means, the cured outer shell being provided for positioning over the filament would dry fiber layer to sandwich the preform between the shells.

6. The method of claim 5, including the steps of positioning a filler layer over the cured inner shell before laying-up the outer shell, the filler layer being of the same thickness as the filament wound dry fiber layer which forms the preform.

7. The method of claim 1, including the step of positioning a cutting barrier on the mandrel about the area of the transport means to prevent scoring of the mandrel by a cutting instrument.

8. The method of claim 7 wherein said cutting barrier is provided of a thin sheet of metal material such as brass and the like.

9. The method of claim 1 wherein tackifier is applied by feeding the filaments to be wound about the mandrel through a tackifier bath.

10. The method of claim 9, including spraying additional tackifier onto the wound filaments.

11. The method of claim 1 wherein said filament winding step includes winding layers of filaments in different winding patterns.

12. The method of claim 11 wherein said winding patterns include helical and circumferential patterns.

13. The method of claim 1, including the step of compacting the filament wound dry fiber layer before cutting the dry fiber layer.

14. The method of claim 13 wherein said compacting step is carried out by the use of a shrink tape.

15. The method of claim 1 wherein said transport means is placed in the mold with the preform.

16. The method of claim 1, including the step of locating a cover means over the filament wound dry fiber layer to sandwich the preform between the transport means and the cover means.

17. The method of claim 16 wherein said cover means is provided with the same peripheral shape as the transport means, and the filament wound dry fiber layer is cut to form the preform while sandwiched between the transport means and the cover means.

18. A method of fabricating a preform for use in a resin transfer molding process, comprising the steps of:
   forming an inner shell of a composite material laid-up and cured on the mandrel, the inner shell including a plurality of sections, with a transport section being one of the sections, and the periphery of the transport section defining a cut line for cutting a preform thereabout;
   forming an outer shell of a composite material laid-up and cured over the cured inner shell, the outer shell including a plurality of sections including a cover section of the same shape and in registry with the transport section of the inner shell;
   removing the outer shell;
   filament winding a dry fiber layer about the mandrel over the inner shell at least in an area including the transport section;
   positioning the outer shell over the filament wound dry fiber layer with the cover section thereof in registry with the transport section of the inner shell to sandwich the filament wound dry fiber layer between the shells;
   cutting the filament wound dry fiber layer through the shells about the peripheries of the cover section of the outer shell and the transport section of the inner shell to provide a preform therebetween;
   transporting the preform to a resin transfer mold by means of at least the transport section of the inner shell; and
   resin transfer molding the preform in the mold.

19. The method of claim 18, including the step of positioning a filler layer over the cured inner shell before laying-up the outer shell, the filler layer being of the same thickness as the filament would dry fiber layer which forms the preform.

20. The method of claim 19 wherein said filler layer is fabricated of a flexible material such as rubber and the like and of the expected thickness of the filament wound composite.

21. The method of claim 18 wherein said sections of said inner and outer shells are fabricated of plies of resin impregnated cloth.

22. The method of claim 18, including the step of positioning a cutting barrier on the mandrel about the area of the transport section to prevent scoring of the mandrel by a cutting instrument.

23. The method of claim 22 wherein said cutting barrier is provided of a thin sheet of metal material such as brass and the like.

24. The method of claim 18 wherein said filament winding step includes winding layers of filaments in different winding patterns.

25. The method of claim 24 wherein said winding patterns include helical and circumferential patterns.

26. The method of claim 18, including the step of compacting the filament wound dry fiber layer before cutting the dry fiber layer.

27. The method of claim 26 wherein said compacting step is carried out by the use of a shrink tape.

28. The method of claim 18 wherein said transport section is placed in the mold with the preform.

29. A method of fabricating a preform for use in a resin transfer molding process, comprising the steps of:
   locating a transport means on a mandrel;
   filament winding a dry fiber layer about the mandrel over the transport means;
   locating a cover means of the same peripheral shape as the transport means over the filament wound dry fiber layer in registry with the transport means beneath the filament wound dry fiber layer;
   cutting the filament wound dry fiber layer about the transport means and cover means to provide a preform sandwiched therebetween;
   transporting the preform to a resin transfer mold by means of at least the transport means; and
   resin transfer molding the preform in the mold.

30. The method of claim 29, including the step of initially forming said transport means to the contour of the mandrel where the transport means is located, by laying-up a plurality of plies of composite material on the mandrel and curing the plies.

31. The method of claim 30, including the step of initially forming said cover means over the cured transport means by laying-up and curing a plurality of plies of composite material.

32. The method of claim 31, including the step of positioning a filler layer over the cured transport means before laying-up the cover means, the filler layer being of the same thickness as the filament wound dry fiber layer which forms the preform.

33. The method of claim 29, including the step of compacting the filament wound dry fiber layer before cutting the dry fiber layer.

34. The method of claim 29, including the step of positioning a cutting barrier on the mandrel about the area of the transport means to prevent scoring of the mandrel by a cutting instrument.

35. The method of claim 29 wherein said filament winding step includes winding layers of filaments in different winding patterns.

36. The method of claim 29 wherein said transport means is placed in the mold with the preform.

37. A method of fabricating a preform for use in a resin transfer molding process, comprising the steps of:
   locating a transport means on a mandrel;

filament winding a dry fiber layer about the mandrel over the transport means;

cutting the filament wound dry fiber layer about the transport means to provide a preform thereon;

transporting the preform to a resin transfer mold by means of the transport means; and resin transfer molding the preform in the mold.

* * * * *